United States Patent
Hayashi et al.

(10) Patent No.: US 8,144,656 B2
(45) Date of Patent: Mar. 27, 2012

(54) MOBILE COMMUNICATION METHOD, MOBILE COMMUNICATION SYSTEM AND RADIO BASE STATION

(75) Inventors: Takahiro Hayashi, Yokosuka (JP); Akihito Hanaki, Yokohama (JP); Junichiro Kawamoto, Tokyo (JP); Yoshikazu Goto, Yokohama (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 534 days.

(21) Appl. No.: 12/368,336

(22) Filed: Feb. 10, 2009

(65) Prior Publication Data

US 2009/0225713 A1 Sep. 10, 2009

(30) Foreign Application Priority Data

Feb. 13, 2008 (JP) ............... P2008-032180
Feb. 2, 2009 (JP) ............... P2009-021699

(51) Int. Cl.
*H04W 72/04* (2009.01)
(52) U.S. Cl. ......... 370/329; 370/341; 370/431; 455/509
(58) Field of Classification Search ........................ None
See application file for complete search history.

(56) References Cited

U.S. PATENT DOCUMENTS

| | | | |
|---|---|---|---|
| 2006/0018282 A1* | 1/2006 | Kwak et al. | 370/331 |
| 2006/0209869 A1* | 9/2006 | Kim et al. | 370/431 |
| 2008/0004058 A1* | 1/2008 | Jeong et al. | 455/517 |
| 2008/0051098 A1* | 2/2008 | Rao | 455/452.1 |
| 2008/0318607 A1* | 12/2008 | Torsner et al. | 455/509 |

FOREIGN PATENT DOCUMENTS

| | | |
|---|---|---|
| JP | 2007-151146 A | 6/2007 |
| WO | WO 2004/102862 A | 11/2004 |
| WO | 2005/018496 A2 | 3/2005 |
| WO | 2007/133135 A1 | 11/2007 |

OTHER PUBLICATIONS

3GPP TS 25.309 V6.6.0 (Mar. 2006), 3rd Generation Partnership Project; Technical Specification Group Radio Access Network; FDD Enhanced Uplink; Overall description; Stage 2, (Release 6), 34 pages.
European search report of Apr. 27, 2011, issued in the counterpart European patent application.
Samsung; "Node B controlled scheduling":3GPP TSG-RAN WG1 Meeting #38 R1-040851; Prague, Czech Republic; Aug. 16-20, 2004 (10 pages).
The office communication of Feb. 24, 2011, issued in the counterpart Chinese patent application.

* cited by examiner

*Primary Examiner* — Chi H. Pham
*Assistant Examiner* — Shick Hom
(74) *Attorney, Agent, or Firm* — Marvin A. Mosenbocker; Mots Law, PLLC

(57) ABSTRACT

The radio base station includes: a step of making a comparison between transmission format identification information received from the mobile station and transmission format identification information based on a data amount calculated in a step of calculating the data amount of uplink user data; and a step of retransmitting a calculated scheduling grant if the radio base station determines, based on the comparison result in the step of the comparison, that a data amount indicated by the transmission format identification information received from the mobile station is larger than the data amount calculated in the aforementioned step.

10 Claims, 6 Drawing Sheets

| E-TFCI | SG |
|---|---|
| 1 | 0 |
| 2 | $(7/15)^2$ |
| ⋮ | ⋮ |
| 31 | $(168/15)^2 \times 6$ |

MOBILE COMMUNICATION METHOD, MOBILE COMMUNICATION SYSTEM AND RADIO BASE STATION

BACKGROUND OF THE INVENTION

1. Field of the Invention

The present invention relates to a mobile communication method, a mobile communication system and a radio base station which comply with a scheme of previously securing hardware resources inside a radio base station, the hardware resources intended to be used for decoding uplink signals transmitted from a mobile station.

2. Description of the Related Art

In a mobile communication system employing an enhanced uplink (EUL) scheme, i.e., a high speed uplink packet access (HSUPA) scheme defined in 3GPP, a radio base station (hereinafter, referred to as NodeB as appropriate) is configured to determine which UE to be allowed to transmit uplink user data and to allocate radio resources for the uplink user data transmission to the mobile station at each transmission time interval (TTI). In other words, the NodeB is configured to determine a transmission rate allowed for the uplink user data transmission from the UE (hereinafter, referred to as UE as appropriate).

Then, the NodeB transmits a scheduling grant (hereinafter, referred to as SG) corresponding to the hardware resources allocated to the UE, to the UE via an E-DCH absolute grant channel (E-AGCH) or an E-DCH relative grant channel (E-RGCH). The UE transmits uplink user data to the NodeB at a transmission rate corresponding to the received SG (see, for example, Japanese Patent Translation Publication No. 2007-151146).

However, there is a problem that the NodeB is likely to fail to receive the uplink user data correctly if a difference exists on recognized hardware resources for transmission of the uplink user data, specifically a recognized uplink user data transmittable rate between the NodeB and the UE.

SUMMARY OF THE INVENTION

Consequently, the present invention was made in consideration of the above described problem. An object the present invention is to provide a mobile communication method, a mobile communication system, and a radio base station which are capable of detecting and eliminating a difference between the radio base station and the mobile station in recognizing hardware resources usable for uplink user data transmission, specifically in recognizing an uplink user data transmittable rate.

To solve the above-described problem, the present invention has the following aspects. Firstly, a first aspect of the present invention provides a mobile communication method in accordance with a scheme of previously securing a hardware resource inside a radio base station before the radio base station notifies a mobile station of a value as a scheduling grant, the hardware resource intended to be used in decoding of uplink signals transmitted from the mobile station, the value used by the mobile station to obtain a power allowed for the mobile station to use for uplink user data transmission. The mobile communication method includes a step A of causing the radio base station to calculate a data amount of uplink user data transmittable in a unit of time by the mobile station on a basis of an amount of the hardware resource secured by the radio base station for the mobile station, a step B of causing the radio base station to calculate the scheduling grant on a basis of the data amount calculated in the step A, a step C of causing the radio base station to notify the mobile station of the scheduling grant calculated in the step B. via a predetermined notification channel, a step D of causing the radio base station to make a comparison between transmission format identification information received from the mobile station and transmission format identification information based on the data amount calculated in the step A, and a step E of causing the radio base station to retransmit the scheduling grant calculated in the step B, if the radio base station determines, based on a comparison result in the step D, that a data amount indicated by the transmission format identification information received from the mobile station is larger than the data amount calculated in the step A.

A second aspect of the present invention provides a mobile communication system in accordance with a scheme of previously securing a hardware resource inside a radio base station before the radio base station notifies a mobile station of a value as a scheduling grant, the hardware resource intended to be used in decoding of uplink signals transmitted from the mobile station, the value used by the mobile station to obtain a power allowed for the mobile station to use for uplink user data transmission. The mobile communication system includes a data amount calculator configured to calculate a data amount of the uplink user data transmittable in a unit time by the mobile station, on a basis of an amount of a hardware resource secured for the mobile station, an SG calculator configured to calculate the scheduling grant on a basis of the data amount calculated by the data amount calculator, a notification unit configured to notify the mobile station of the scheduling grant calculated by the SG calculator, via a predetermined notification channel; and a determination unit configured to make a comparison between transmission format identification information received from the mobile station and transmission format identification information based on the data amount calculated by the data amount calculator. If the determination unit determines that a data amount indicated by the transmission format identification information received from the mobile station is larger than the data amount calculated by the SG calculator, the determination unit causes the notification unit to retransmit the scheduling grant calculated by the data amount calculator.

A third aspect of the present invention provides a radio base station in accordance with a scheme of previously securing a hardware resource inside a radio base station before the radio base station notifies a mobile station of a value as a scheduling grant, the hardware resource intended to be used in decoding of uplink signals transmitted from the mobile station, the value used by the mobile station to obtain a power allowed for the mobile station to use for uplink user data transmission. The radio base station includes a data amount calculator configured to calculate a data amount of the uplink user data transmittable in a unit time by the mobile station, on a basis of an amount of a hardware resource secured for the mobile station, an SG calculator configured to calculate the scheduling grant on a basis of the data amount calculated by the data amount calculator, a notification unit configured to notify the mobile station of the scheduling grant calculated by the SG calculator, via a predetermined notification channel, and a determination unit configured to make a comparison between a transmission format identification information received from the mobile station and a transmission format identification information based on the data amount calculated by the data amount calculator. If the determination unit determines that a data amount indicated by the transmission format identification information received from the mobile station is larger than the data amount calculated by the SG calculator, the determination unit causes the notification unit to retransmit the scheduling grant calculated by the data amount calculator.

According to the present invention, a mobile communication method, a mobile communication system, and a radio base station are provided which are capable of detecting and eliminating a difference between the radio base station and the mobile station in recognizing hardware resources usable for uplink user data transmission, specifically in recognizing an uplink user data transmittable rate.

DETAILED DESCRIPTION OF EMBODIMENTS (Configuration of Mobile Communication System According To First Embodiment)

With reference to FIGS. 1 to 5, description will be given of a configuration of a mobile communication system according to a first embodiment of the present invention.

In the mobile communication system according to this embodiment, an EUL scheme is employed. Retransmission control complying with a hybrid ARQ (HARQ) is used in uplink data communication between a radio base station NodeB and a mobile station UE.

Figure 1:
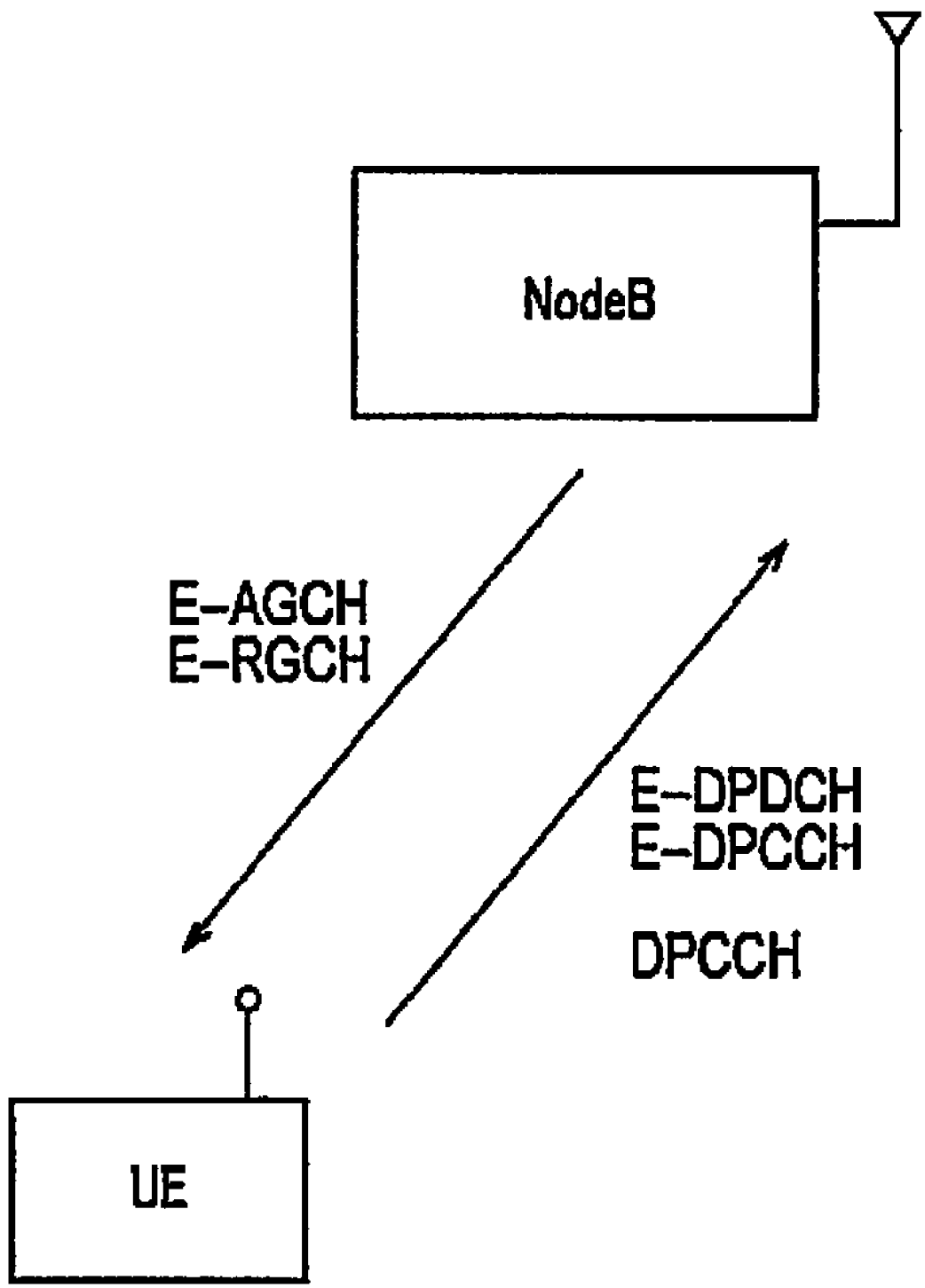
FIG. 1 is an overall configuration view of a mobile communication system according to a first embodiment of the present invention.

In this mobile communication system, as shown in FIG. 1, the following channels are established as downlink channels between the NodeB and the UE: an E-AGCH which is a transmission rate control channel used for notification of a transmission rate itself at which uplink user data can be transmitted; an E-RGCH which is a transmission rate control channel used for notification of an increase or a decrease of an uplink user data transmittable rate; and the like.

Furthermore, the following channels are established as uplink channels between the NodeB and the UE: an E-DCH dedicated physical control channel (E-DPCCH) which is a control channel used for EUL communications; an E-DCH dedicated physical data channel (E-DPDCH) which is a data channel used for EUL communications; a dedicated physical control channel (E-DPCCH) which is a control channel used for usual communications; and the like.

Additionally, this mobile communication system complies with a scheme of previously securing hardware resources inside the base station NodeB which are used for decoding of uplink signals transmitted from the UE before the NodeB notifies the UE of a power permitted to be used by the UE for transmission of uplink user data, as a scheduling grant (hereinafter referred to as SG as appropriate).

Figure 2:
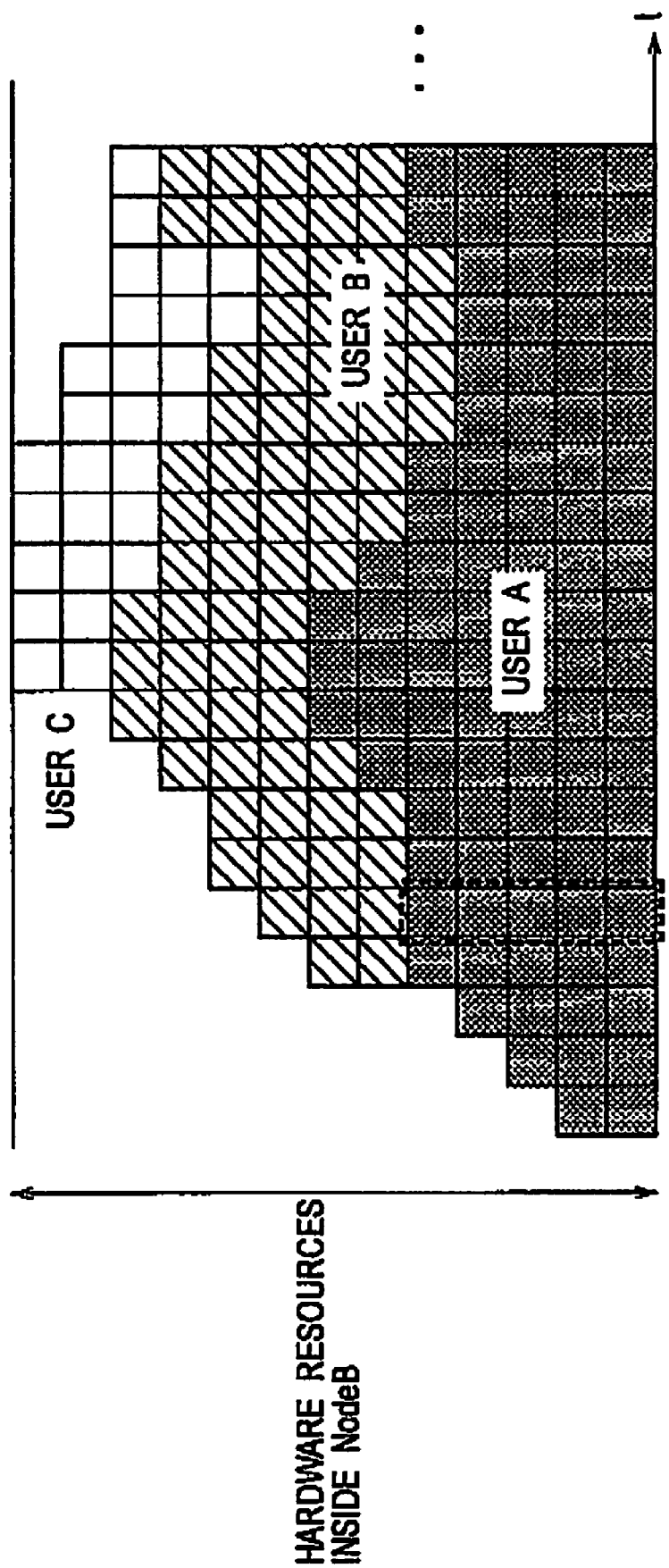
FIG. 2 is a diagram explaining a concept of a hardware resource determination method used in the mobile communication system according to the first embodiment of the present invention.

FIG. 2 is a diagram explaining a concept of a hardware resource determination method used in the mobile communication system according to the first embodiment of the present invention. As shown in FIG. 2, in this mobile communication system, the NodeB allocates hardware resources inside the NodeB to connected users A to C (UE).

Thereafter, the NodeB calculates E-DCH transport format combination indicator (E-TFCI) based on hardware resources allocated to each of the users, and calculates SG based on the E-TFCI, respectively. Furthermore, the NodeB notifies the mobile stations UE of the corresponding calculated SG via the E-AGCH.

Additionally, in the mobile communication system, each of the mobile stations UE transmits uplink user data via the E-AGCH or the E-RGCH at the SG, specifically, at a transmission rate specified by the NodeB.

As shown by areas enclosed by dotted lines in FIG. 2, hardware resources allocated to the respective connected users (UE) momentarily vary in accordance with conditions of the NodeB.

Note that, in this embodiment, the hardware resources at least include radio resources such as various data channels and is control channels, and a processing capacity of the NodeB. Additionally, the hardware resources may include other resources affecting processing performed by the NodeB with respect to uplink user data.

Figures 3, 4:
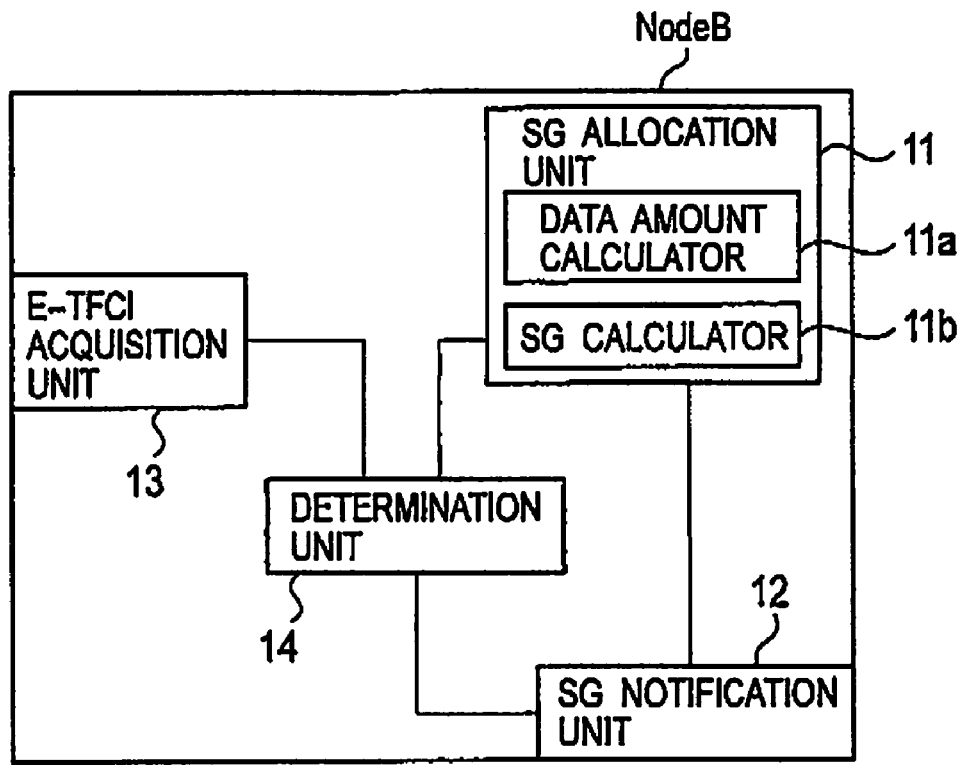
FIG. 3 is a functional block diagram of a radio base station according to the first embodiment of the present invention.
FIG. 4 is one example of a correspondence table of E-TFCI and SG which are managed by the radio base station according to the first embodiment of the present invention.

As shown in FIG. 3, the NodeB includes an SG allocation unit 11, an SG notification unit 12, an E-TFCI acquisition unit 13, and a determination unit 14.

In a cell under the control of the NodeB, the SG allocation unit 11 selects a UE to be allowed to transmit uplink user data at each TTI (subframe), from among mobile stations (serving mobile stations) UE assigned the cell as a serving cell. Subsequently, the SG allocation unit 11 allocates hardware resources such as radio resources for the uplink user data transmission to the UE. In other words, the SG allocation unit 11 determines an uplink user data transmittable rate for the UE.

Specifically, the SG allocation unit 11 is formed by a data amount calculator 11a and an SG calculator 11b.

Based on amounts of hardware resources secured for the UE, the data amount calculator 11a calculates a data amount (specifically, a transport block (TB) size) of uplink user data, the data amount being allowed to be transmitted by the UE per unit of time.

Based on the data amount calculated by the data amount calculator 11a, the SG calculator 11b calculates an SG (a transmission rate). Note that the SG does not necessarily represent a transmission rate directly, as long as the SG is a value based on which the UE can obtain a power allowed to be used for transmission of uplink user data. For example, a ratio between powers of the E-DPDCH and the E-DPCCH may be used as the SG.

Based on a result of the calculation performed by the SG calculator 11b, the SG allocation unit 11 outputs the SG corresponding to the radio resource (transmission rate) allocated to the UE.

Via a predetermined notification channel, the SG notification unit 12 notifies the UE of the SG calculated by the SG calculator 11b. In this embodiment, the SG notification unit 12 constitutes a notification unit.

Specifically, based on the SG outputted by the SG allocation unit 11, the SG notification unit 12 transmits an absolute grant (AG) or a relative grant (RG) to the UE via the E-AGCH or the E-RGCH. That is, the SG notification unit 12 notifies the UE of the uplink user data transmittable rate.

The E-TFCI acquisition unit 13 acquires an E-TFCI which is a transmission format used for transmission of uplink user data received from the UE. In this embodiment, the E-TFCI constitutes transmission format identification information.

Specifically, based on coding of the E-DPCCH corresponding to the E-DPDCH used in the transmission of the uplink user data received from the UE, the E-TFCI acquisition unit 13 acquires the E-TFCI.

The determination unit 14 makes a comparison between the E-TFCI received from the UE and an E-TFCI determined based on the data amount calculated by the data amount calculator 11a. Specifically, the determination unit 14 determines whether or not the SG (corresponding to uplink user data transmittable rate notified to the UE) notified by the SG notification unit 12 matches an SG (corresponding to the uplink user data transmission rate received from the UE) corresponding to the E-TFCI acquired by the E-TFCI acquisition unit 13.

For example, with reference to a correspondence table shown in FIG. 4, the determination unit 14 searches for the SG corresponding to the E-TFCI acquired by the E-TFCI acquisition unit 13.

Here, if the determination unit 14 determines that a data amount indicated by the E-TFCI received by the UE is larger than the data amount calculated by the data amount calculator 11a, the determination unit 14 causes the SG notification unit 12 to retransmit the SG calculated by the SG calculator 11b to the UE.

That is, if the SG (corresponding to a transmission rate received from a certain UE for transmitting uplink user data) corresponding to the E-TFCI acquired by the E-TFCI acquisition unit 13 is larger than the SG (corresponding to a transmission rate which has been notified to the UE and at which uplink user data can be transmitted) notified to the UE by the SG notification unit 12, the SG notification unit 12 again transmits the SG corresponding to the radio resource (transmission rate) allocated to the UE, to the UE.

Additionally, if the determination unit 14 determines that a data amount indicated by an E-TFCI received by the UE a predetermined period after the SG notification to the UE is larger than the data amount calculated by the data amount calculator 11a, the determination unit 14 can also cause the SG notification unit 12 to retransmit the SG calculated by the SG calculator 11b.

Figure 5:
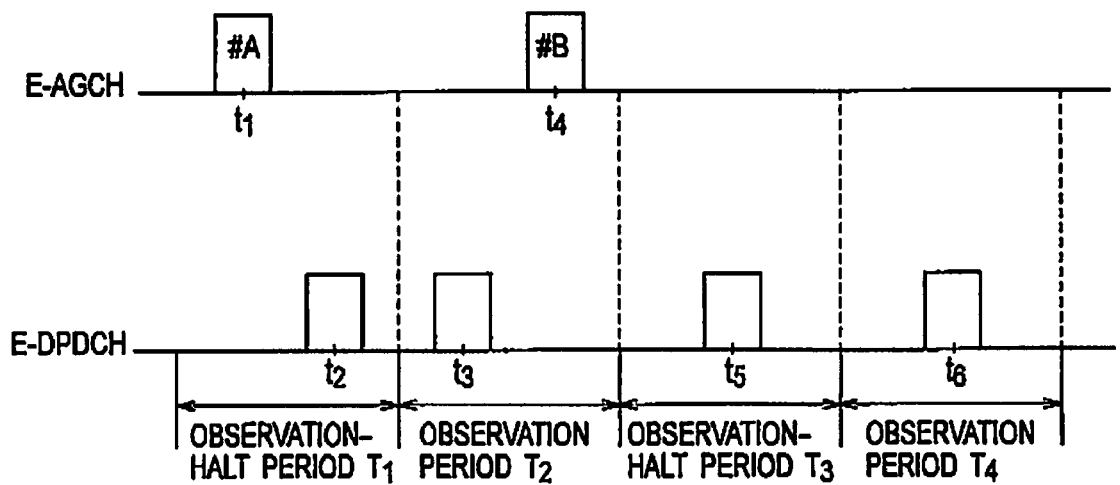
FIG. 5 is a diagram provided for explaining a manner in which the radio base station performs notification of an SG according to the first embodiment of the present invention.

For example, as shown in FIG. 5, it is assumed that an SG #A is allocated to the UE corresponding to an uplink user data transmittable rate and is notified by the SG notification unit 12 to the mobile station via an E-AGCH at t1. If a transmission rate of uplink user data received at t3 in an observation period T2 is larger than the SG #A after the notification of the SG #A via the E-AGCH at t1, the SG notification unit 12 can again notify the UE of an SG #B corresponding to an uplink user data transmittable rate based on the hardware resource reserved for the UE.

Meanwhile, even if a transmission rate of uplink user data received at t2 in the observation-halt period T1 is larger than the SG #A after the notification of the SG #A at t1 via the E-AGCH, the SG notification unit 12 may determine that the SG#A has not been reflected yet in the UE, and may not notify any more the mobile station of the SG# B corresponding to the uplink user data transmittable rate. In other words, during an observation-halt period, the NodeB does not find a value of an E-TFCI received from the UE, and therefore does not execute the above described operation of reducing the SG.

(Operations of Mobile Communication System According To First Embodiment)

Figure 6:
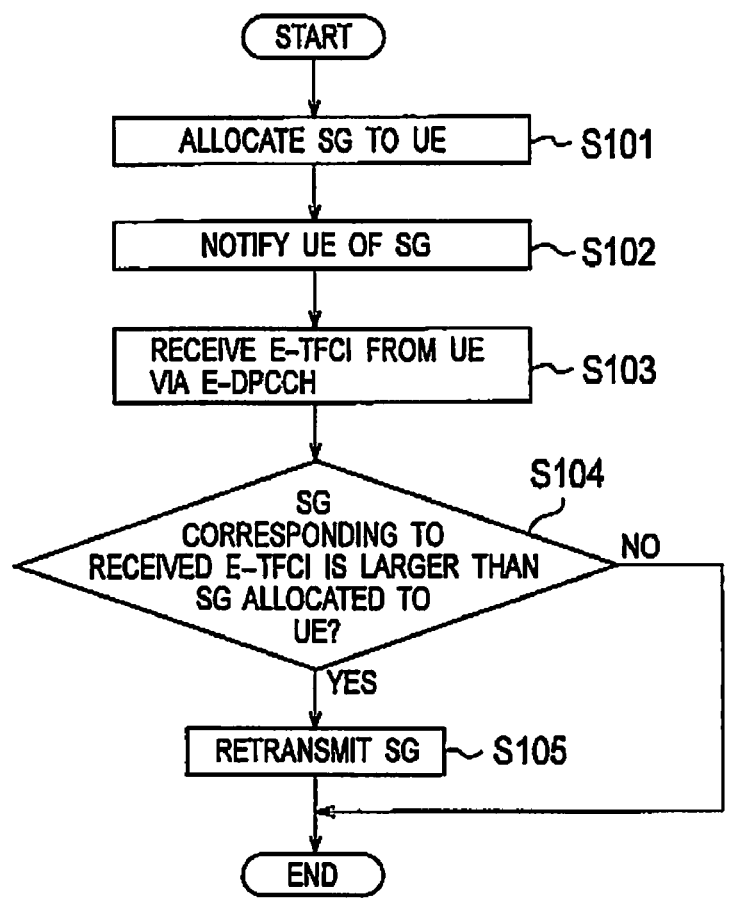
FIG. 6 is a flowchart showing operations of the mobile communication system according to the first embodiment of the present invention.

With reference to FIG. 6, description will be given of operations of the mobile communication system according to the first embodiment of the present invention.

As shown in FIG. 6, in step S101, a NodeB allocates an SG corresponding to an uplink user data transmittable rate, to a scheduling target UE in each TTI on the basis of the amount of a hardware resource secured for the UE.

In step S102, the NodeB notifies the UE of the allocated SG via an E-AGCH or an E-RGCH.

In step S103, the NodeB receives an E-TFCI transmitted from the UE via an E-DPCCH.

In step S104, the NodeB determines whether or not a transmission rate (a transmission rate specified by an SG corresponding to the E-TFCI) of uplink user data received during an observation period is larger than a transmission rate corresponding to the latest SG notified to the UE.

If the transmission rate of the received uplink user data is determined to be larger, the NodeB retransmits the SG allocated in step S102 to the UE via the E-AGCH or the E-RGCH, in step S105. In this case, the NodeB may discard the uplink user data transmitted via an E-DPDCH corresponding to the E-DPCCH.

(Advantageous Effects of Mobile Communication System According To First Embodiment)

Conventionally, when a connected user (UE) transmits uplink user data by using an E-TFCI lower than or equal to an E-TFCI assumed based on an SG notified to the connected user by a NodeB, the NodeB can perform processing such as decoding of uplink signals by only utilizing hardware resources allocated to the connected user. Therefore NodeB can receive the uplink user data.

By contrast, when the connected user transmits uplink user data by using an E-TFCI higher than an E-TFCI assumed based on an SG notified to the connected user by the NodeB, the NodeB cannot perform processing such as decoding of uplink signals by utilizing hardware resources secured for the connected user, and therefore has no other choice but to discard the uplink user data received from the UE.

With the mobile communication system according to the present embodiment, if a transmission rate of uplink user data received by the NodeB from a certain UE is larger than a transmission rate which has been notified to the UE and at which uplink user data can be transmitted, the NodeB notifies the UE again of the uplink user data transmittable rate. Accordingly, the mobile communication system can eliminate a difference between the NodeB and the UE in recognizing an uplink user data transmittable rate.

Additionally, with the mobile communication system according to the present embodiment, the NodeB can avoid the above described re-notification of an SG if a predetermined period has not yet passed since notification by the NodeB of the uplink user data transmittable rate (within an observation-halt period). Accordingly, wasting of radio resources, which is the above described re-notification of the SG, can be avoided when the NodeB receives uplink user data transmitted at a transmission rate to which the latest SG has not yet been reflected.

(Mobile Communication System According To Second Embodiment)

Figure 7:
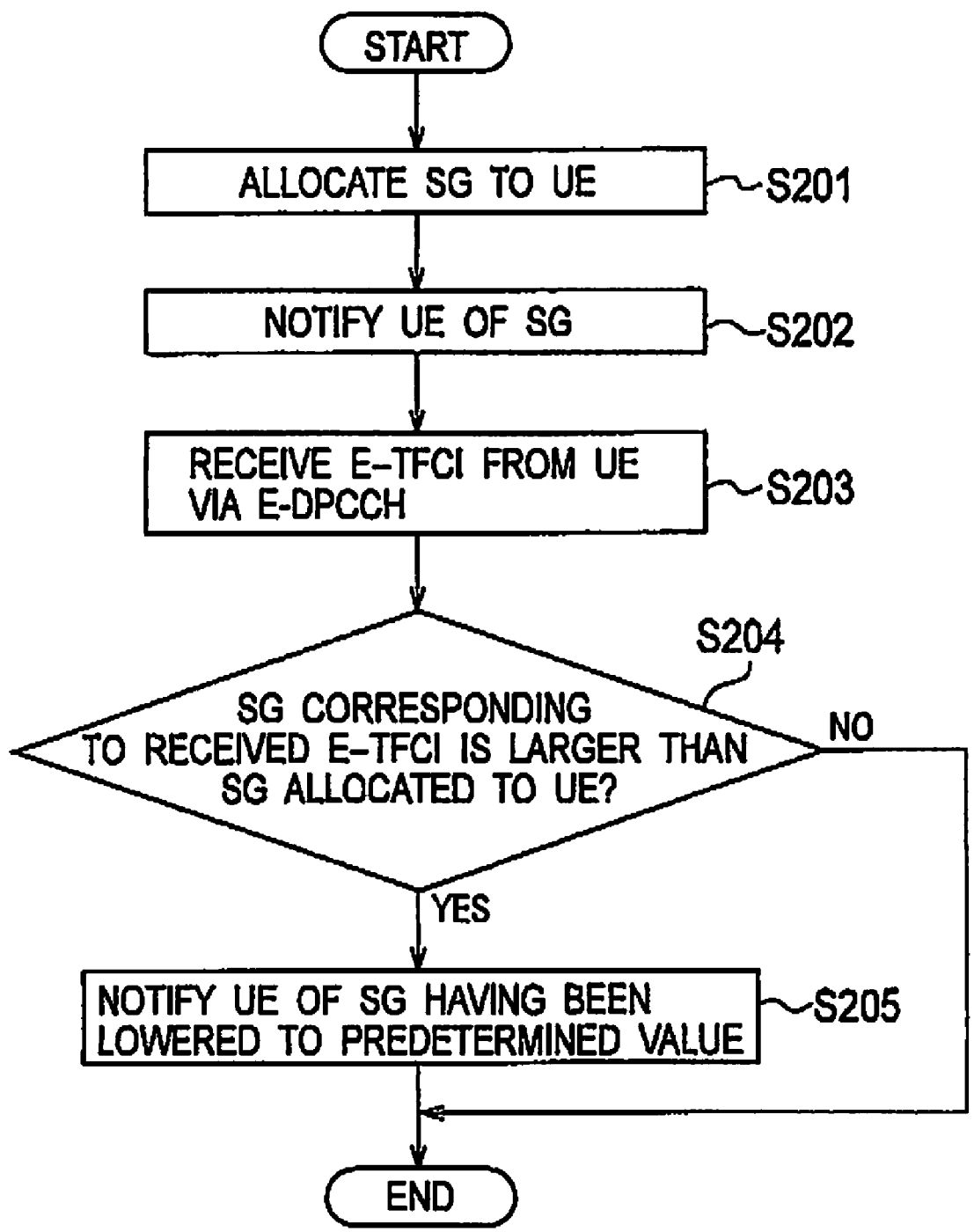
FIG. 7 is a flowchart showing operations of a mobile communication system according to a second embodiment of the present invention.

With reference to FIG. 7, description will be given of a mobile communication system according to a second embodiment of the present invention. Hereinafter, focused on differences from the mobile communication system according to the first embodiment, description will be given of the mobile communication system according to the second embodiment.

Specifically, with reference to FIG. 7, description will be given of operations of the mobile communication system according to the second embodiment.

As shown in FIG. 7, operations in steps S201 to S204 are the same as those in steps S101 to S104 shown in FIG. 6.

If the radio based station NodeB determines that a transmission rate of uplink user data received during an observation period (a transmission rate specified by an SG corresponding to an E-TFCI acquired based on an E-DPCCH via which the uplink user data is transmitted) is larger than a transmission rate corresponding to the latest SG notified to the UE (YES in step S204), the NodeB lowers the transmission rate at which the above uplink user data can be transmitted, to a predetermined value, and then notifies again the UE of the SG corresponding to this transmission rate, via the E-AGCH or the E-RGCH, in step S205.

That is, if the determination unit 14 according to the present invention determines that a data amount indicated by an E-TFCI received from the UE is larger than a data amount calculated by the data amount calculator 11a, the determination unit 14 lowers the SG to the predetermined value, and then causes the SG notification unit 12 to transmit the SG thus lowered to the predetermined value.

(Mobile Communication System According To Third Embodiment)

Figure 8:
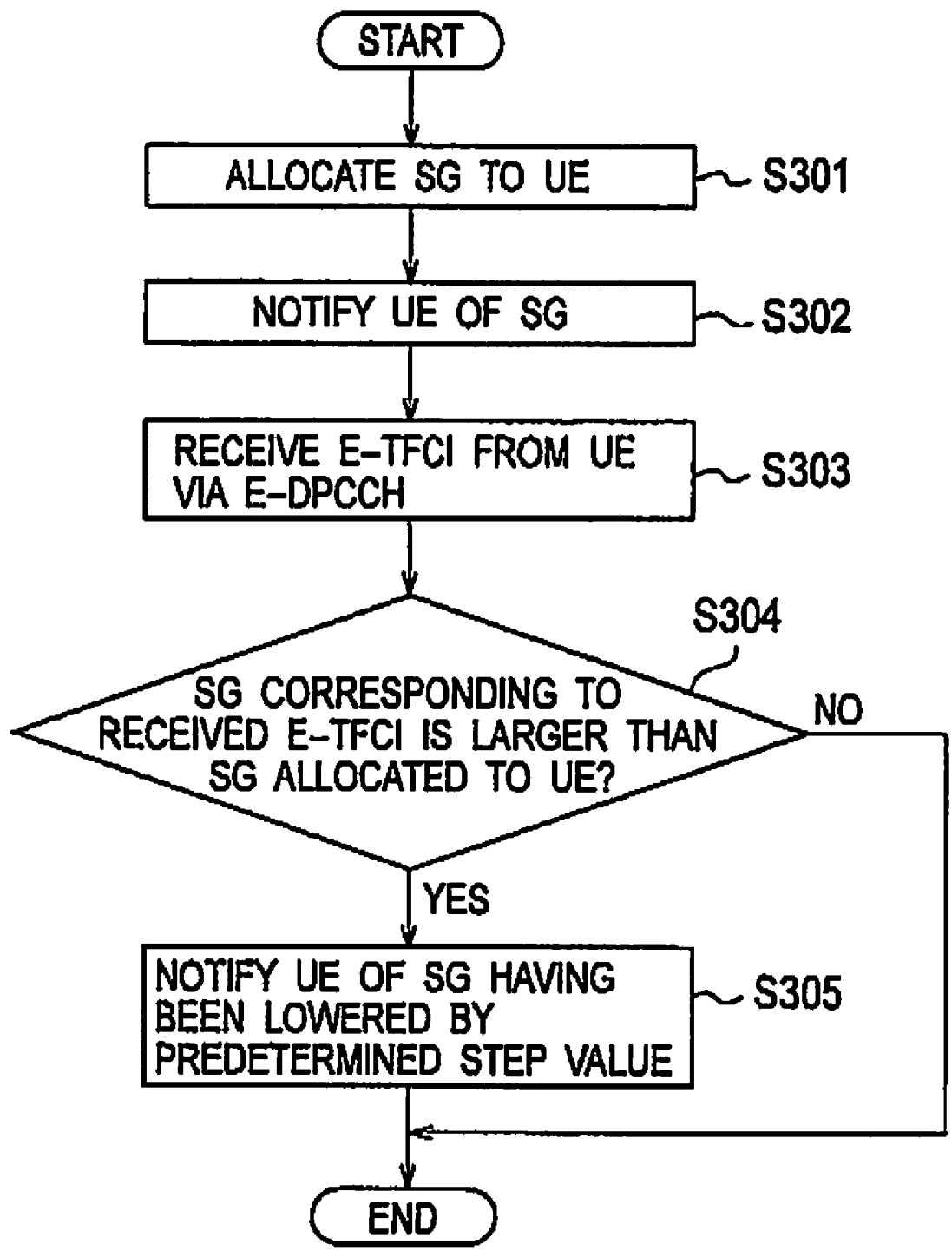
FIG. 8 is a flowchart showing operations of a mobile communication system according to a third embodiment of the present invention.

With reference to FIG. 8, description will be given of a mobile communication system according to a third embodiment of the present invention. Hereinafter, focused on differences from the mobile communication system according to the first embodiment, description will be given of the mobile communication system according to the third embodiment.

Specifically, with reference to FIG. 8, description will be given of operations of the mobile communication system according to the third embodiment.

As shown in FIG. 8, operations in steps S301 to 8304 are the same as those in steps S101 to S104 shown in FIG. 6.

If the NodeB determines that a transmission rate of uplink user data received during an observation period (a transmission rate specified by an SG corresponding to an E-TFCI acquired based on an E-DPCCH via which the uplink user data is transmitted) is larger than a transmission rate corresponding to the latest SG notified to the UE (Yes in step S304), the NodeB lowers the uplink user data transmittable rate only by a predetermined value (by a predetermined step value), and then notifies the UE again of an SG corresponding to this transmission rate, via the E-AGCH or the E-RGCH, in step S305.

That is, if the determination unit 14 according to the present invention determines that a data amount indicated by an E-TFCI received from the UE is larger than a data amount calculated by the data amount calculator 11a, the determination unit 14 lowers the SG not to the predetermined value but by the predetermined value, and then causes the SG notification unit 12 to transmit the SG having been thus lowered by the predetermined value.

Note that the above described operations of the NodeB and the UE may be implemented by hardware, may be implemented by software modules executed by a processor, or may be implemented by a combination of the hardware and the software modules.

The software modules are provided inside a storage medium of any form, such as a random access memory (RAM), a flush memory, a read only memory (ROM), an erasable programmable ROM (EPROM), an electronically erasable and programmable ROM (EEPROM), a register, a hard disk, a removable disk or a CD-ROM.

In order for a processor to read or write information from or into the storage medium, the storage medium is connected to the processor. Alternatively, the storage medium may be integrated in the processor. Still alternatively, the storage medium and the processor may be provided inside an ASIC. The ASIC may be provided inside the UE, the radio base station Node B or a radio network controller (RNC). Alternatively, the storage medium and the processor may be provided as discrete components inside the UE and the NodeB.

While the present invention has been described hereinabove in detail by use of the above described embodiments, it is apparent to those skilled in the art that the present invention is not limited to the embodiments described in the present description. The present invention can be implemented as revised or modified forms without departing from the spirit and scope of the present invention which are defined by description of the scope of claims. Accordingly, the description in the present specification has been given for the purpose of illustration, and does not have any restrictive implications on the present invention.

Note that the entire contents of the Japanese Patent Applications No. 2008-032180, filed on Feb. 13, 2008, and No. 2009-021699, filed on Feb. 2, 2009, are incorporated herein by reference.

What is claimed is:

1. A mobile communication method in accordance with a scheme of previously securing a hardware resource inside a radio base station before the radio base station notifies a mobile station of a value as a scheduling grant, the hardware resource intended to be used in decoding of uplink signals transmitted from the mobile station, the value used by the mobile station to obtain a power allowed for the mobile station to use for uplink user data transmission, the mobile communication method comprising:
a step A of causing the radio base station to calculate a data amount of uplink user data transmittable in a unit of time by the mobile station on a basis of an amount of the hardware resource secured by the radio base station for the mobile station;
a step B of causing the radio base station to calculate the scheduling grant on a basis of the data amount calculated in the step A;
a step C of causing the radio base station to notify the mobile station of the scheduling grant calculated in the step B, via a predetermined notification channel;
a step D of causing the radio base station to make a comparison between transmission format identification information received from the mobile station and transmission format identification information based on the data amount calculated in the step A; and
a step E of causing the radio base station to retransmit the scheduling grant calculated in the step B, if the radio base station determines, based on a comparison result in the step D, that a data amount indicated by the transmission format identification information received from the mobile station is larger than the data amount calculated in the step A;
wherein if the transmission format identification information received from the mobile station is larger than the calculated data amount of uplink user data calculated in step A, the scheduling grant is lowered to a predetermined value, and then the lowered scheduling grant is retransmitted.

2. A mobile communication method in accordance with a scheme of previously securing a hardware resource inside a radio base station before the radio base station notifies a mobile station of a value as a scheduling grant, the hardware resource intended to be used in decoding of uplink signals transmitted from the mobile station, the value used by the mobile station to obtain a power allowed for the mobile station to use for uplink user data transmission, the mobile communication method comprising:
a step A of causing the radio base station to calculate a data amount of uplink user data transmittable in a unit of time by the mobile station on a basis of an amount of the hardware resource secured by the radio base station for the mobile station;
a step B of causing the radio base station to calculate the scheduling grant on a basis of the data amount calculated in the step A;
a step C of causing the radio base station to notify the mobile station of the scheduling grant calculated in the step B, via a predetermined notification channel;
a step D of causing the radio base station to make a comparison between transmission format identification information received from the mobile station and transmission format identification information based on the data amount calculated in the step A; and
a step E of causing the radio base station to retransmit the scheduling grant calculated in the step B, if the radio base station determines, based on a comparison result in the step D, that a data amount indicated by the transmission format identification information received from the mobile station is larger than the data amount calculated in the step A;
wherein if the transmission format identification information received from the mobile station is larger than the calculated data amount of uplink user data calculated in step A, the scheduling grant is lowered by a predetermined step value, and then the lowered scheduling grant is retransmitted.

3. A mobile communication system in accordance with a scheme of previously securing a hardware resource inside a radio base station before the radio base station notifies a mobile station of a value as a scheduling grant, the hardware resource intended to be used in decoding of uplink signals transmitted from the mobile station, the value used by the mobile station to obtain a power allowed for the mobile station to use for uplink user data transmission, the mobile communication system comprising:
a data amount calculator configured to calculate a data amount of the uplink user data transmittable in a unit time by the mobile station, on a basis of an amount of a hardware resource secured for the mobile station;
an SG calculator configured to calculate the scheduling grant on a basis of the data amount calculated by the data amount calculator;
a notification unit configured to notify the mobile station of the scheduling grant calculated by the SG calculator, via a predetermined notification channel; and
a determination unit configured to make a comparison between transmission format identification information received from the mobile station and transmission format identification information based on the data amount calculated by the data amount calculator,
wherein, if the determination unit determines that a data amount indicated by the transmission format identification information received from the mobile station is larger than the data amount calculated by the SG calculator, the determination unit causes the notification unit to retransmit the scheduling grant calculated by the data amount calculator;
wherein, if the determination unit determines that the data amount indicated by the transmission format identification information received from the mobile station is larger than the data amount calculated by the data amount calculator, the determination unit lowers the scheduling grant to a predetermined value, and then causes the notification unit to retransmit the scheduling grant lowered to the predetermined value.

4. The mobile communication system according to claim 3, wherein if the determination unit determines that the data amount indicated by the transmission format identification information received from the mobile station a predetermined period of time after the notification of the scheduling grant is larger than the data amount calculated by the data amount calculator, the determination unit causes the notification unit to retransmit the scheduling grant calculated by the SG calculator.

5. A mobile communication system in accordance with a scheme of previously securing a hardware resource inside a radio base station before the radio base station notifies a mobile station of a value as a scheduling grant, the hardware resource intended to be used in decoding of uplink signals transmitted from the mobile station, the value used by the mobile station to obtain a power allowed for the mobile station to use for uplink user data transmission, the mobile communication system comprising:
a data amount calculator configured to calculate a data amount of the uplink user data transmittable in a unit time by the mobile station, on a basis of an amount of a hardware resource secured for the mobile station;
an SG calculator configured to calculate the scheduling grant on a basis of the data amount calculated by the data amount calculator;
a notification unit configured to notify the mobile station of the scheduling grant calculated by the SG calculator, via a predetermined notification channel; and
a determination unit configured to make a comparison between transmission format identification information received from the mobile station and transmission format identification information based on the data amount calculated by the data amount calculator,
wherein, if the determination unit determines that a data amount indicated by the transmission format identification information received from the mobile station is larger than the data amount calculated by the SG calculator, the determination unit causes the notification unit to retransmit the scheduling grant calculated by the data amount calculator;
wherein, if the determination unit determines that the data amount indicated by the transmission format identification information received from the mobile station is larger than the data amount calculated by the data amount calculator, the determination unit lowers the scheduling grant to a predetermined value, and then causes the notification unit to retransmit the scheduling grant lowered to the predetermined value;
wherein if the determination unit determines that the data amount indicated by the transmission format identification information received from the mobile station is larger than the data amount calculated by the data amount calculator, the determination unit lowers the scheduling grant by a predetermined step value, and then causes the notification unit to retransmit the scheduling grant lowered by the predetermined value.

6. The mobile communication system according to claims 5, wherein if the determination unit determines that the data amount indicated by the transmission format identification information received from the mobile station a predetermined period of time after the notification of the scheduling grant is larger than the data amount calculated by the data amount calculator, the determination unit causes the notification unit to retransmit the scheduling grant calculated by the SG calculator.

7. A radio base station in accordance with a scheme of previously securing a hardware resource inside a radio base station before the radio base station notifies a mobile station of a value as a scheduling grant, the hardware resource intended to be used in decoding of uplink signals transmitted from the mobile station, the value used by the mobile station to obtain a power allowed for the mobile station to use for uplink user data transmission, the radio base station comprising:
a data amount calculator configured to calculate a data amount of the uplink user data transmittable in a unit time by the mobile station, on a basis of an amount of a hardware resource secured for the mobile station;
an SG calculator configured to calculate the scheduling grant on a basis of the data amount calculated by the data amount calculator;
a notification unit configured to notify the mobile station of the scheduling grant calculated by the SG calculator, via a predetermined notification channel; and
a determination unit configured to make a comparison between a transmission format identification information received from the mobile station and a transmission format identification information based on the data amount calculated by the data amount calculator,
wherein, if the determination unit determines that a data amount indicated by the transmission format identification information received from the mobile station is larger than the data amount calculated by the SG calculator, the determination unit causes the notification unit to retransmit the scheduling grant calculated by the data amount calculator,
wherein, if the determination unit determines that the data amount indicated by the transmission format identification information received from the mobile station is larger than the data amount calculated by the data amount calculator, the determination unit lowers the scheduling grant to a predetermined value, and then causes the notification unit to retransmit the scheduling grant lowered to the predetermined value.

8. The radio base station according to claim 7, wherein if the determination unit determines that the data amount indicated by the transmission format identification information received from the mobile station a predetermined period of time after the notification of the scheduling grant is larger than the data amount calculated by the data amount calculator, the determination unit causes the notification unit to retransmit the scheduling grant calculated by the SG calculator.

9. A radio base station in accordance with a scheme of previously securing a hardware resource inside a radio base station before the radio base station notifies a mobile station of a value as a scheduling grant, the hardware resource intended to be used in decoding of uplink signals transmitted from the mobile station, the value used by the mobile station to obtain a power allowed for the mobile station to use for uplink user data transmission, the radio base station comprising:
a data amount calculator configured to calculate a data amount of the uplink user data transmittable in a unit time by the mobile station, on a basis of an amount of a hardware resource secured for the mobile station;
an SG calculator configured to calculate the scheduling grant on a basis of the data amount calculated by the data amount calculator;
a notification unit configured to notify the mobile station of the scheduling grant calculated by the SG calculator, via a predetermined notification channel; and
a determination unit configured to make a comparison between a transmission format identification information received from the mobile station and a transmission format identification information based on the data amount calculated by the data amount calculator,
wherein, if the determination unit determines that a data amount indicated by the transmission format identification information received from the mobile station is larger than the data amount calculated by the SG calculator, the determination unit causes the notification unit to retransmit the scheduling grant calculated by the data amount calculator,
wherein if the determination unit determines that the data amount indicated by the transmission format identification information received from the mobile station is larger than the data amount calculated by the data amount calculator, the determination unit lowers the scheduling grant by a predetermined step value, and then causes the notification unit to retransmit the scheduling grant lowered by the predetermined value.

10. The radio base station according to claim 9, wherein if the determination unit determines that the data amount indicated by the transmission format identification information received from the mobile station a predetermined period of time after the notification of the scheduling grant is larger than the data amount calculated by the data amount calculator, the determination unit causes the notification unit to retransmit the scheduling grant calculated by the SG calculator.

* * * * *